United States Patent [19]

Ezaki et al.

[11] Patent Number: 4,562,502
[45] Date of Patent: Dec. 31, 1985

[54] OPTICAL REPRODUCING SYSTEM

[75] Inventors: Joichiro Ezaki; Hiroshi Kanai; Yoshimi Kitahara, all of Nagano, Japan

[73] Assignee: TDK Corporation, Tokyo, Japan

[21] Appl. No.: 486,681

[22] Filed: Apr. 20, 1983

[30] Foreign Application Priority Data

Apr. 28, 1982 [JP] Japan .................. 57-72209
Apr. 28, 1982 [JP] Japan .................. 57-72210

[51] Int. Cl.$^4$ ............................ G11B 5/32; G11B 7/02
[52] U.S. Cl. .................... 360/114; 350/375; 360/113; 365/122
[58] Field of Search ............ 360/114, 113, 110; 350/375-378; 365/121-122, 2, 10, 127, 183; 369/13; 357/30

[56] References Cited

U.S. PATENT DOCUMENTS

| | | | |
|---|---|---|---|
| 3,158,673 | 11/1964 | Sites ........................ | 365/122 |
| 3,500,354 | 3/1970 | Smith et al. ............... | 365/122 |
| 3,651,498 | 3/1972 | Magill et al. .............. | 365/122 |
| 3,668,671 | 6/1972 | Everett et al. ............ | 360/114 |
| 3,899,778 | 8/1975 | Roberts .................... | 365/127 |
| 3,952,290 | 4/1976 | Wiliams .................... | 365/127 |
| 4,228,473 | 10/1980 | Himuro et al. ........... | 360/114 |

OTHER PUBLICATIONS

Kump et al., "Laser Readout for Magnetic Film Memory," *IBM Tech. Disc. Bull.*, Feb. 1966, vol. 8, No. 9, pp. 1244-1245.

*Primary Examiner*—Stuart N. Hecker
*Assistant Examiner*—David J. Severin
*Attorney, Agent, or Firm*—Collard, Roe & Galgano

[57] ABSTRACT

An optical reproducing system for reading out magnetically recorded data comprises an optical head (4,4a,4b,4c,4d) for copying magnetic pattern on a magnetic recording medium like a magnetic tape (1), a conversion system (5,6,7,8,9,10) for converting a magnetic pattern on the optical head (4 et al.) to an optical pattern by using the Faraday effect which rotates a polarization of an LED beam (light emission diode) or a laser beam according to magnetic polarity in a domain in said optical head, a charge coupled device (3, CCD) with a plurality of cells for converting beam energy polarized according to recorded data to correspond to electrical output signal. The CCD device effects the conversion or reading of a plurality of data simultaneously.

10 Claims, 6 Drawing Figures

OPTICAL REPRODUCING SYSTEM

BACKGROUND OF THE INVENTION

The present invention relates to a reproducing system for magnetically recorded information, in particular, relates to such a system which reads out magnetically recorded information using an optical technique.

Conventionally, magnetically recorded information, recorded for instance on a magnetic tape, a magnetic disc, or a magnetic sheet, is read out by a magnetic head which has a magnetic core with a thin gap and a coil wound on said core. A magnetic head operates on the principle that the relative movement of the head to the recording medium generates electromotive force on the coil according to the recorded information.

However, that conventional magnetic head has the disadvantage that the recording density on a recording medium cannot be so high. They say that a conventional magnetic head needs a recording track wider than 30 $\mu$m.

In order to solve the above problem, one of the solutions is an optical head which reads out magnetically recorded information using an optic-magnetic effect or the Faraday effect. According to that optical head, a soft magnetic film which has a magnetically soft nature having the easy magnetization axis in the thickness direction of the film contacts with a recording medium which records information magnetically, and the vertical component of the magnetically recorded information on the recording medium is copied on that soft magnetic film. The information on the soft magnetic film is read out optically using the Faraday effect in which an optical beam is subject to the rotation of the polarization plane according to the magnetic direction of a magnetic domain of that soft magnetic film. As the Faraday effect is used, an optical polarizer and an optical analyzer are usually used to detect the optical rotation of polarized optical beam.

However, a prior optical head has the disadvantage that it takes a long time to read out magnetically recorded information, since only a single bit on a soft magnetic film is read out at a time by illuminating said film with a thin spot of a laser beam. When a high speed read out is requested, a recording medium must run faster, but the improvement of the read out speed by high speed running the recording medium is not large.

SUMMARY OF THE INVENTION

It is an object, therefore, of the present invention to overcome the disadvantages and limitations of a prior reproducing system for reproducing magnetically recorded information by providing a new and improved optical reproducing system.

It is also an object of the present invention to provide an optical reproducing system which reads out magnetically recorded information in a short time by processing a plurality of data simultaneously.

The above and other objects are attained by an optical reproducing system for reading out magnetically stored information comprising; (a) an optical head for obtaining magnetic copy of data magnetically recorded on a recording medium; (b) conversion means for converting said magnetic pattern to an optical pattern; (c) a reception means for receiving said optical pattern to convert said optical pattern to an electrical signal; and (d) said reception means converting said optical pattern with a plurality of data to said electrical signal simultaneously.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 1:
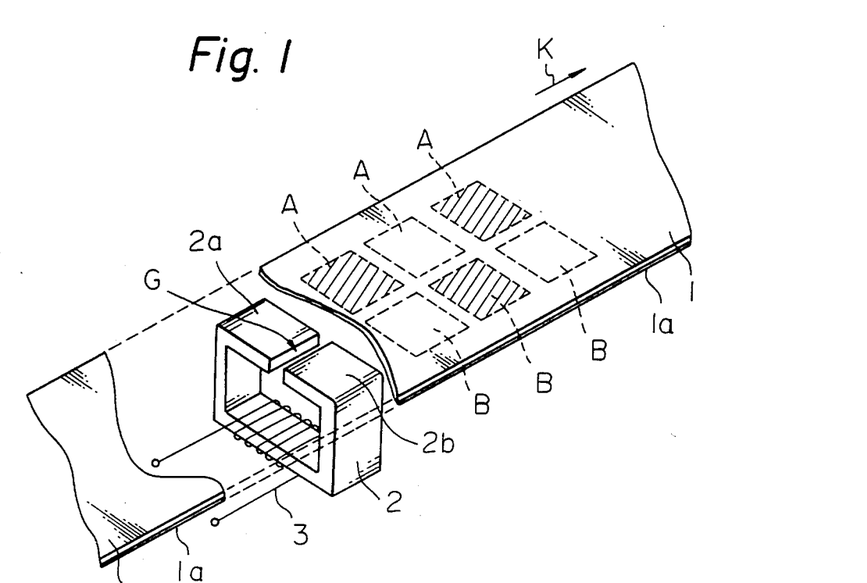
FIG. 1 is the explanatory drawing of the theoretical principle of the present recording system.
Figure 2:
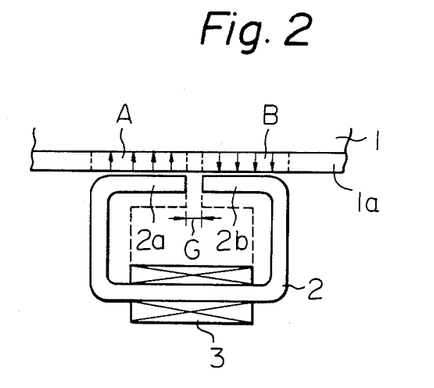
FIG. 2 is also the explanatory drawing of the present recording system.

First, one example of a magnetic recording for the optical reading is described in accordance with FIGS. 1 and 2 for the easy understanding of the present invention.

In FIG. 1, the reference numeral 1 is a magnetic recording medium with a magnetic recording film 1a. That recording medium 1 is, for instance, a magnetic tape or a magnetic disc, and the magnetic medium 1 runs in the direction D. The magnetic recording head 52 with the gap G and the winding 53 is arranged close to said magnetic recording film 1a. The winding 53 is energized with a recording signal which is preferably in a digital form. It should be noted in FIG. 1 that the longitudinal direction of the gap G coincides with the running direction D of the magnetic medium while in a conventional magnetic recording system, a gap of a magnetic head is positioned perpendicular to the running direction of the magnetic medium. Further, it should be appreciated that the width (d) of the gap G is considerably wide (for instance, d=4 $\mu$m) as compared with a conventional magnetic head in which a gap width is for instance 0.3–0.5 $\mu$m. A signal to be recorded in this case is supposed to be in digital form, and the pulse width ($\mu$sec) of the digital signal is considerably narrow as compared with the wavelength of the recorded signal on the recording medium 1. That wavelength is defined by the moving speed of the medium 1, and the repetition frequency of the signal. In one embodiment, when a tape runs with the speed of 4.7 cm/sec, the pulse width is less than 47 $\mu$sec, and is preferably less than 1.0 $\mu$sec, and still preferably that pulse width is of the order of nano seconds.

In the above configuration, when a recording signal flows in the coil 53, the magnetic flux circulates through the core 53, the yoke 52a, the area (A) of the medium 1, the area (B), and the yoke 52b. Thus, a pair of magnetic cells A and B, which may be N and S, or S and N are provided on the medium 1 according to the recording signal. Thus, those cells A and B store one bit of information. Those cells A and B may be N and S, or S and N according to the recording information (1 or 0). It should be noted that the shape of the pattern A and B is the same as the shape of the yokes 52a and 52b. Plurality pairs of cells compose a pattern of recorded data.

It should be appreciated that the magnetic flux generated by the winding 53 does not go through the gap G, but the flux goes through the first yoke, the medium and the second yoke, because that gap G is too wide to shunt the magnetic path.

It should be appreciated that at two-dimensional pattern like a picture may be recorded by arranging a plurality of heads of FIG. 1. In that case, each cell in a picture is represented by a pair of elements A and B on a recording medium.

Now, the reproducing stage by optical head according to the present invention is described.

Figure 3:
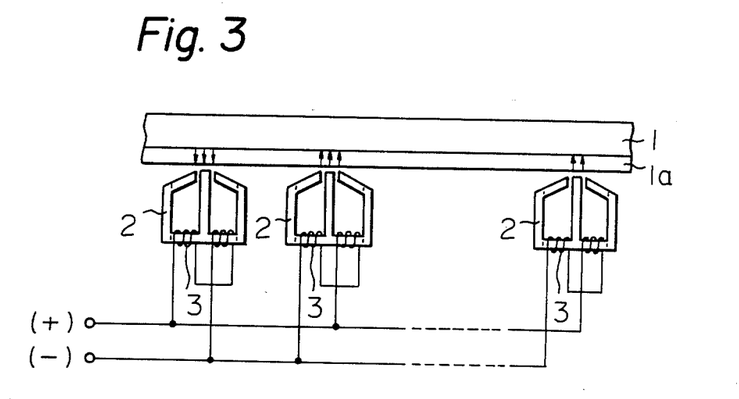
FIG. 3 shows the explanatory drawing showing the basic idea of the present two-dimensional read-out system.

FIG. 3 shows the principal idea of the present optical head. In the figure, the reference numeral 1 is a recording medium like a magnetic tape, which runs in the direction D. It is supposed that the medium 1 has the magnetic layer on which a digital signal (like PCM signal) is recorded. The digital signal may be recorded not only by the vertical recording system but also the conventional horizontal recording system. The reference numeral 2 is a conversion means for converting magnetic pattern on an optical head to an optical pattern by using the Faraday rotation of the polarized plane of the electro-magnetic wave or an optical beam. A plurality of data, that is to say, m number data in the running direction of the tape 1, and n number of data in the width direction of the tape 1, are read out simultaneously by said conversion means 2, and that data is applied to the reception system 3. The conversion means 2 reads out the data optically as described later.

The reception system 3 has a two-dimensional plane parallel to the tape 1, and a plurality of cells each relating to the data on the tape 1 are provided on that plane. That is to say, m number of cells times n number of cells are arranged on the plane. Thus, each cell relates to each data on the medium. The reception system 3 is, for instance, implemented by a plurality of photo-transistors arranged on the plane, alternatively, that reception system 3 is implemented by a charge coupled semiconductor device (CCD). Each cell on the reception system reproduces the relating data on the magnetic tape, and that cell provides an output reproducing electrical signal according to the data stored in the medium 1.

Figure 4:
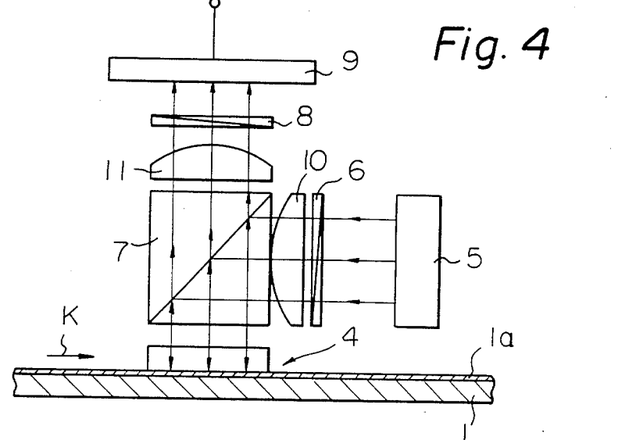
FIG. 4 shows the structure of the optical read-out system according to the present invention.

FIG. 4 shows the optical reproducing system according to the present invention, in which the same reference numerals show the same members as those in the previous figures. The reference numeral 4 is an optical head which operates on the principle of the optic-magnetic effect.

Figure 5:
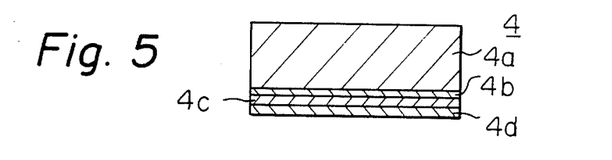
FIG. 5 shows the cross section of the read-out head according to the present invention.

FIG. 5 shows the cross section of that optical head 4 in detail. In FIG. 5, the symbol 4a is a GdGa garnet substrate which is optically transparent and has the thickness of 0.2–0.5 mm. The symbol 4b is a soft magnetic film with a magnetically soft nature attached on the surface of that substrate 4a. The symbol 4c is a reflection film attached on the soft magnetic film 4b for reflecting an optical beam, and the symbol 4d is a protection layer of $S_iO_2$ attached on the reflection film 4c. The soft magnetic film 4b is made of the optically transparent and soft magnetic material, like $YS_mC_aF_eG_e$ group garnet (for instance $Y_{1.92}S_{m0.1}F_{e4.02}G_{e0.98}O_{12}$), and said soft magnetic film 4b has the easy magnetization axis which is perpendicular to the film plane, and said soft magnetic film has the thickness of about 6 μm. The optical head 4 is used so that film 4d touches with the recording medium 1.

When the optical head 4 touches with the recording medium 1, the magnetic domain in the soft magnetic film 4b is magnetized by the vertical component of the recorded data on the medium 1 in the vertical direction to the film plane. When a digital signal, like PCM signal is recorded on the medium, the magnetic pattern in the domain on the soft magnetic film is a copy of the digital signal recorded on the medium 1. That magnetic pattern of the domain is read out optically.

In FIG. 4, the reference numeral 5 is an optical source for generating an optical beam, and is implemented for instance by an LED (light emission diode), or a He-Ne laser, 6 is a polarizer which polarizes linearly the beam from the optical source 5. The numeral 7 is a beam splitter which offsets the horizontal beam in the figure, but passes directly the vertical beam in the figure. The numerals 9 and 10 are a condenser lens and a focusing lens, respectively. The reference numeral 8 is an optical analyzer, and 3 is a CCD device.

It should be appreciated that an LED (light emission diode) is more preferable as an optical source 5 than a laser, since according to the present invention a beam must have some cross section so that a plurality of cells are illuminated simultaneously. Further the price of LED is cheaper than that of a laser.

In FIG. 4, an optical beam generated by the source 5 illuminates the optical head 4 through the polarizer 6 which polarizes the beam linearly, the beam splitter 7 which reflects or offsets the beam. It is supposed that the beam has some cross section area, and therefore, some area on the optical head 4 is illuminated simultaneously. The beam thus illuminating the optical head 4 is reflected by the reflection film 4c in the optical head 4, and the reflected beam illuminates the CCD device through the beam splitter 7, the lens 10, and the optical analyzer 8. When the beam illuminates the optical head, the polarization is rotated by the Faraday effect in the right or left direction according to the direction of the magnetization in the domain on the soft magnetic film 4b. Since the beam is polarized by the polarizer 6, the output beam from the analyzer 8 is modulated by the rotation direction by the Faraday effect, that is to say, the intensity of the beam at the output of the analyzer 8 depends upon the recorded data. The intensity of the modulated beam of the output of the analyzer 8 illuminates the CCD device 3 so that the two dimension pattern of the data on the medium is copied on the plane of the CCD device.

In FIG. 4, the reference numeral 20 is a pulse generator which supplies a transfer pulse to the CCD device, and an operation pulse to a motor (not shown) which rotates the capstans 22 and 22a to feed the magnetic tape 1 so that each transfer of the charge in the CCD device 3 is synchronized with the movement of data on the magnetic tape 1. The numeral 30 is an output terminal of the CCD device 3 for providing an output electrical signal.

In one modification of the present invention, an optical head 4 might be omitted, and a magnetic pattern on a recording medium 1 is directly illuminated by an optical beam and said magnetic pattern is directly read out without copying the pattern to the head 4.

Figure 6:
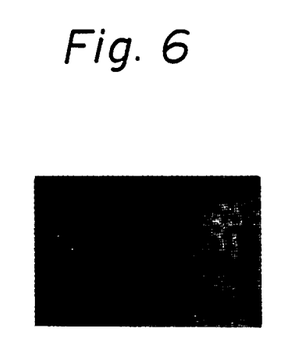
FIG. 6 shows the arrangement of the information on a recording medium, which is read-out by the present system.
Figure 7:
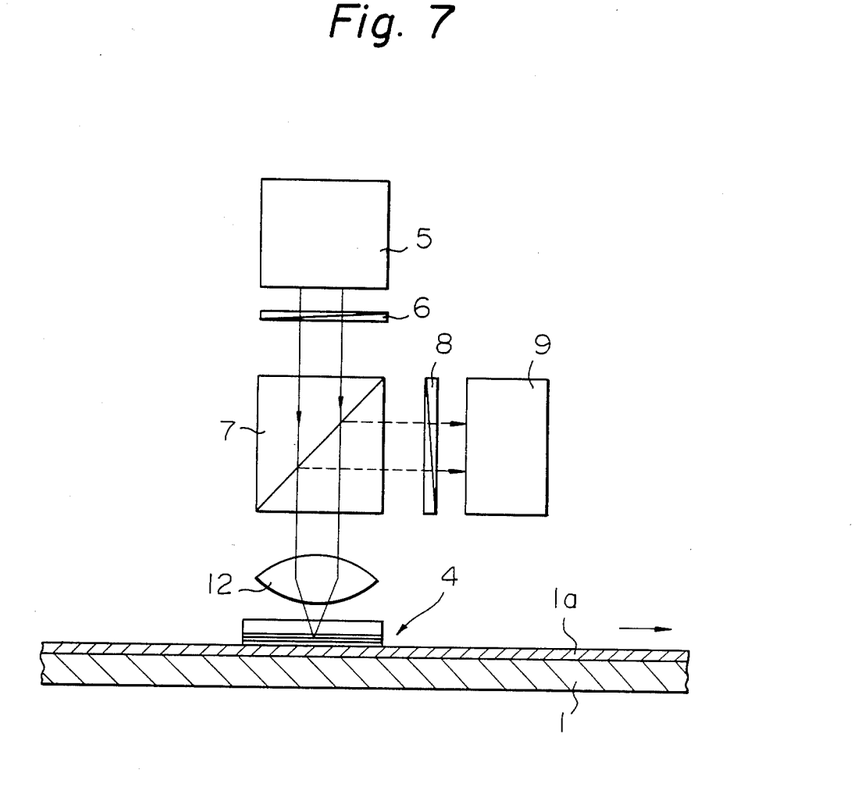

Two operational modes are possible in the present invention concerning the synchronization of the transfer of the charge in the CCD device with the movement of the magnetic tape 1. It is assumed that n=128 data are stored in the width direction of the magnetic tape 1, and m=16 data are grouped in the moving direction D of the magnetic tape 1 as shown in FIG. 6. In the first operational mode, a copy of 16×128 data is illuminated on the CCD device, and when those 16×128 (=2048) data are read out by the CCD device, the magnetic tape 1 moves in the direction D by the 16 data length so that the succeeding 16 data are read out. In this first mode, the operational speed of the present invention as compared with the system which reads out the data one bit after one is 2048(=16×128) times.

On the other hand, in the second operational mode, the magnetic tape 1 moves in the direction D by a single data length synchronized with each transfer of the charge in the CCD device. In this second operational mode, each line of data with n=128 data is substantially read out 16 times by the CCD device. That is to say, in the first stage, those 128 data illuminate the first line on the CCD device, and when the charge on the first line in the CCD device is transferred to the second line, the magnetic tape 1 is moved by the data length. Therefore, in the second stage, the same 128 data illuminates the second line on the CCD device. Thus, the second line is illuminated twice. By repeating the above operation, each line of 128 data illuminates the CCD device 16 times. Therefore, the substantial sensitivity of the CCD device is 16 times as high as that of the first operational mode.

As described above in detail, an optical head copies a magnetic pattern which has a plurality of data on a recording medium simultaneously, and said magnetic pattern modulates an optical beam so that said optical beam includes a plurality of data information, and then, information carried by said beam is simultaneously converted to an electrical signal by using a two-dimensional reception means. Thus, the reading speed in the first operational mode according to the present invention is expressed;

$$f = nmv$$

where n is the number of data in the width direction of a recording medium, m is the number of data in the moving direction of the recording medium, and v is the moving speed of the recording medium, and it should be appreciated that said speed f is considerably improved as compared with that of a conventional optical reproducing system which reads out data one bit after one bit. Further, the sensitivity of the CCD device is considerably improved in the second operational mode by transferring the charge in the CCD device synchronized with the movement of the recording medium. The reading speed f' in the second operational mode is;

$$f' = mv$$

Further, the moving speed of the recording medium may be slowed without deteriorating the reading out speed.

Accordingly, it should be appreciated that the reading speed and/or the sensitivity of the present optical reproducing system is considerably improved by reading a plurality of data which are arranged on a two-dimensional plane simultaneously.

Further, it should be appreciated that a two-dimension pattern like a picture on a magnetic medium may be read out by illuminating the whole pattern with a laser beam. In that case, it should be appreciated that a pattern is not scanned, as is done in a prior art.

We also tried the numerical embodiment in which m=256 and n=128 in our experiment, and observed that the excellent result is obtained.

From the foregoing it will now be apparent that a new and improved optical reproducing system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. An optical reproducing system for reading out magnetically stored information comprising;
    (a) an optical head for obtaining magnetic copy in a magnetic pattern of data magnetically recorded on an area of a recording medium which contacts said optical head and moves relative to said optical head,
    (b) conversion means for converting said magnetic pattern to an optical pattern,
    (c) a reception means for receiving said optical pattern to convert said optical pattern to an electrical signal,
    (d) said reception means converting said optical pattern with a plurality of data to said electrical signal simultaneously.

2. An optical reproducing system according to claim 1, wherein said reception means has a two dimensional array of photo-transistors.

3. An optical reproducing system according to claim 1, wherein said optical head comprises a substrate (4a), a soft magnetic film (4b) attached on said substrate (4a), a reflection film (4c) attached on said soft magnetic film (4b), and said soft magnetic film (4b) takes a copy of magnetically recorded pattern on a recording medium to effect a rotation of polarization plane of a beam which illuminates the recording medium according to recorded data.

4. An optical reproducing system according to claim 1, wherein said conversion means comprises an optical source for generating an optical beam, a polarizer for polarizaing linearly said optical beam, a beam splitter for offsetting an output beam of said polarizer to illuminate said optical head with an output beam of said polarizer and passing through a beam reflected by said optical head, and an analyzer arranged at an output of said beam splitter to detect a polarized beam according to recorded data.

5. An optical reproducing according to claim 4, wherein said optical source is a He-Ne laser source.

6. An optical reproducing system according to claim 4, wherein said optical source is an LED source.

7. An optical reproducing system according to claim 4, wherein said optical beam has some cross section enough for illuminating a plurality of magnetic cells on a recording medium simultaneously.

8. An optical reproducing system according to claim 1 wherein said reception means is a charge coupled device.

9. An optical reproducing system according to claim 8, wherein said electrical signal in said charge coupled device is transferred in synchronization with the movement of the recording medium.

10. An optical reproducing system according to claim 9, wherein a line of signal in said charge coupled device is transferred in synchronization a line of movment of said recording medium.

* * * * *

UNITED STATES PATENT AND TRADEMARK OFFICE
CERTIFICATE OF CORRECTION

PATENT NO. : 4,562,502
DATED : DECEMBER 31, 1985
INVENTOR(S) : JOICHIRO EZAKI ET AL

It is certified that error appears in the above-identified patent and that said Letters Patent are hereby corrected as shown below:

Delete drawing Figs. 1-7 appearing in the patent and substitute therefor Figs. 1-6 attached hereto.

The Title Page should be deleted to appear as per attached title page.

Signed and Sealed this

Thirteenth Day of January, 1987

*Attest:*

DONALD J. QUIGG

*Attesting Officer*   Commissioner of Patents and Trademarks

United States Patent [19]

Ezaki et al.

[11] Patent Number: 4,562,502
[45] Date of Patent: Dec. 31, 1985

[54] OPTICAL REPRODUCING SYSTEM

[75] Inventors: Joichiro Ezaki; Hiroshi Kanai; Yoshimi Kitahara, all of Nagano, Japan

[73] Assignee: TDK Corporation, Tokyo, Japan

[21] Appl. No.: 486,681

[22] Filed: Apr. 20, 1983

[30] Foreign Application Priority Data

Apr. 28, 1982 [JP] Japan .................. 57-72209
Apr. 28, 1982 [JP] Japan .................. 57-72210

[51] Int. Cl.$^4$ .................. G11B 5/32; G11B 7/02
[52] U.S. Cl. .................. 360/114; 350/375; 360/113; 365/122
[58] Field of Search .................. 360/114, 113, 110; 350/375-378; 365/121-122, 2, 10, 127, 183; 369/13; 357/30

[56] References Cited

U.S. PATENT DOCUMENTS

| 3,158,673 | 11/1964 | Sites | 365/122 |
| 3,500,354 | 3/1970 | Smith et al. | 365/122 |
| 3,651,498 | 3/1972 | Magill et al. | 365/122 |
| 3,668,671 | 6/1972 | Everett et al. | 360/114 |
| 3,899,778 | 8/1975 | Roberts | 365/127 |
| 3,952,290 | 4/1976 | Wiliams | 365/127 |
| 4,228,473 | 10/1980 | Himuro et al. | 360/114 |

OTHER PUBLICATIONS

Kump et al., "Laser Readout for Magnetic Film Memory," *IBM Tech. Disc. Bull.*, Feb. 1966, vol. 8, No. 9, pp. 1244-1245.

*Primary Examiner*—Stuart N. Hecker
*Assistant Examiner*—David J. Severin
*Attorney, Agent, or Firm*—Collard, Roe & Galgano

[57] ABSTRACT

An optical reproducing system for reading out magnetically recorded data comprises an optical head (4,4a,4b,4c,4d) for copying magnetic pattern on a magnetic recording medium like a magnetic tape (1), a conversion system (5,6,7,8,9,10) for converting a magnetic pattern on the optical head (4 et al.) to an optical pattern by using the Faraday effect which rotates a polarization of an LED beam (light emission diode) or a laser beam according to magnetic polarity in a domain in said optical head, a charge coupled device (3, CCD) with a plurality of cells for converting beam energy polarized according to recorded data to correspond to electrical output signal. The CCD device effects the conversion or reading of a plurality of data simultaneously.

10 Claims, 6 Drawing Figures